April 10, 1934.  A. MEISSNER  1,954,678
ELECTRIC HEATING APPARATUS
Filed Nov. 29, 1932
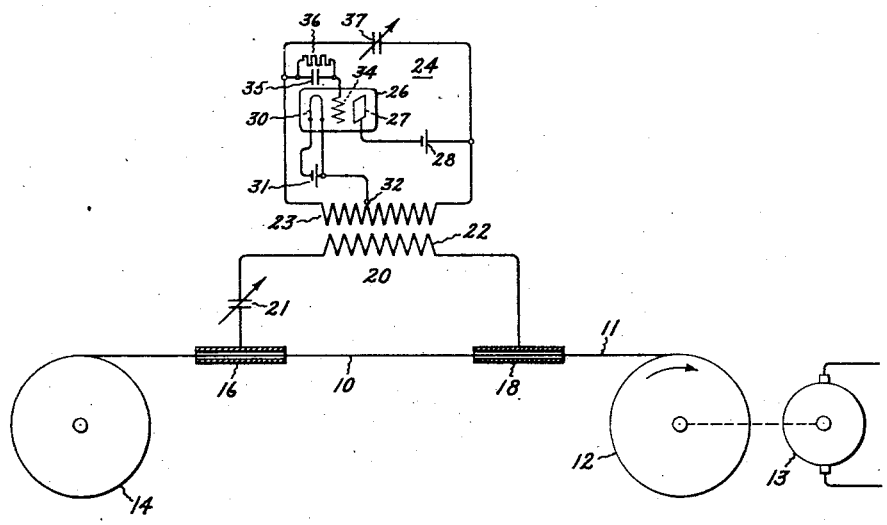
Inventor:
Alexander Meissner,
by Chas E. Mulla
His Attorney.

UNITED STATES PATENT OFFICE 1,954,678

ELECTRIC HEATING APPARATUS

Alexander Meissner, Berlin-Dahlem, Germany, assignor to General Electric Company, a corporation of New York Application November 29, 1932, Serial No. 644,862
In Germany December 4, 1931

6 Claims. (Cl. 219—11)

My invention relates to electric heating apparatus, more particularly to electric heaters of the type in which the heat is generated in the heated body itself, and has for an object the provision of a simple, reliable and effective heating apparatus utilizing currents of high frequency.

My invention has particular application to heating apparatus in which an attenuated article such as an insulated wire is to be heated during the insulating process. The present invention is of particular importance when the wire is kept in continuous movement, as for example, during the application of enamel or other insulating coatings. My invention may also be applied to change the physical properties of metals or alloys. For example, wires of iron and nickel alloys by heating to approximately 600° F. and subsequent slow cooling increases the permeability of the wire.

In carrying out my invention in one form, a pair of electrodes spaced apart from each other and along the material to be heated, is connected to a source of high frequency and a capacitance coupling is provided between each electrode and the material or wire to be heated.

For a more complete understanding of my invention, reference should be had to the drawing in which I have diagrammatically illustrated my invention.

Referring now to the drawing, I have shown my invention in one form as applied to the heating of a wire 10, the leading end 11 of which is wound upon a drum 12. A motor 13 is arranged to drive the drum 12. The application of the enamel may be made by dipping the wire in an enameling bath (not shown) located between the wire supply reel 14 and the electrode 16. Preferably the electrode 16, as well as the cooperating electrode 18, is of cylindrical shape so that the wire as it passes from the reel 14 to the reel 12 may be threaded through the cylindrical electrode. The capacitance between the electrodes and the wire is maintained as high as possible by designing the electrodes so that the distance between the wire and the electrodes is maintained as small as possible without contact between the electrodes and the wire. The electrodes 16 and 18 are connected in a high frequency circuit 20 which includes a variable condenser 21 and a coil 22. The coil 22 is inductively coupled by means of the coil 23 to a high frequency generator 24.

The high frequency generator itself may be any one of the several types known to the art, the requirement being that it is capable of generating frequencies of 10,000 cycles up to a million cycles or more. As shown, the generator 24 is of the type used in generating high frequencies for transmission of radio signals. An electric valve 26 has an anode 27 connected in series with the source of high voltage 28 to one side of the coil 23. A cathode 30 is heated by a source of current 31 and is connected to coil 23 at 32. The control electrode 34 of the valve 26 is connected to the opposite end of the coil 23 through a grid condenser 35 and a grid leak resistance 36. The variable condenser 37 is connected across the anode 27 and the control electrode 34 and serves to control the frequency generated by the electric valve.

The frequency of the generator is selected in accordance with the thickness of the wire, the capacitance between electrodes 16 and 18, and the temperature to which it is desired to heat the wire 10. For example, if it is desired to heat the wire over a considerable length a lower frequency is selected. For small distances frequencies around a million cycles are desirable. After this frequency is selected the condenser 21 is adjusted to tune the high frequency circuit 20 to the generator 24. The conductor 10 is then heated by the flow of current along the portion of the conductor between the electrodes 16 and 18. Inasmuch as each electrode is capacitively coupled to the wire 10 without physical engagement with it, the insulating enamel may be quickly and evenly dried.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Electric heating apparatus comprising means for moving a material to be heated along a predetermined path, a pair of electrodes spaced apart along said path of movement in spaced relation with said material to form a capacitance coupling between said material and said electrodes, a capacitor, conductors for connecting said electrodes in circuit with said capacitor and means for supplying high frequency current to said circuit whereby current flows between said electrodes through said material.

2. Electric heating apparatus comprising means for moving a material to be heated along a predetermined path, a pair of electrodes spaced apart along said path of movement of said material in spaced relation with said material to form a capacitance coupling between said material and said electrodes, and means for supplying a high frequency current to said electrodes so that the current path between said electrodes includes the portion of the material between said electrodes.

3. Electric heating apparatus comprising means for moving a material to be heated along a predetermined path, a plurality of electrodes spaced apart along said path of movement, a source of high frequency current, supply connections for connecting said source of high frequency current to said electrodes so that said material forms a current path between them, the transfer of the current from the electrodes to the material being due to the capacitance between the electrodes and the material.

4. Electric heating apparatus comprising means for moving an attenuated electrically conductive article to be heated along a predetermined path, a pair of electrodes spaced apart along said path of movement and arranged in spaced relation with said article to form a capacitance coupling between said article and said electrodes, an inductance, connections for connecting said electrodes in series with said inductance to form an inductive circuit, means for tuning said circuit, and means for supplying high frequency current to said circuit the length of the article between said electrodes forming a part of said circuit.

5. Means for drying enamel and the like on electric conductors comprising means for moving the conductor along a predetermined path, a source of high frequency current, and means for capacitively applying said source of high frequency between two points spaced apart along the path of movement of said conductor so that said conductor is heated by flow of current from one to the other of said points.

6. The method of drying insulation on electrical conductors which consists in moving the conductor along a predetermined path, generating a high frequency current, and capacitively applying said high frequency current at points spaced apart along said path of movement of said conductor so as to heat said conductor by the flow of current from one to the other of said points.

ALEXANDER MEISSNER.